Patented Nov. 18, 1941

2,262,813

UNITED STATES PATENT OFFICE 2,262,813

LUBRICANT

Arnold J. Morway, Roselle, and John C. Zimmer, Hillside, N. J., assignors to Standard Oil Development Company, a corporation of Delaware No Drawing. Application August 13, 1938, Serial No. 224,733

6 Claims. (Cl. 260—100)

The present invention relates to improvements in lubricants and more specifically to blended lubricants, both liquid and solid, for obtaining increased load bearing capacity. The invention will be fully understood from the following description.

It has been found that excellent addition agents for lubricants can be prepared by treatment of various reactive organic materials with phosphorus halides especially with phosphorus trichloride. The chemical nature of the reaction is obscure at the present time, but studies seem to indicate that the organic material treated is polymerized to some extent and possibly also cyclicized, but in addition phosphorus and chlorine are introduced into the molecule in a stable form. The nature of the products depends to some extent on the particular reaction conditions, proportion of ingredients, but to a much greater extent on the nature of the organic material employed. The organic materials that may be employed belong to many specific classes, but are all characterized by reactive unsaturated linkages of olefinic or aromatic types. Among the materials, olefin hydrocarbons may be employed, especially those having molecular weights above 120 to 150. These may be prepared by cracking or dehydrogenation of petroleum fractions or by polymerization with low boiling olefins such as ethylene, propylene, the various butylenes especially isobutylene. Solvent extraction products are also suitable especially those obtained in the refining of kerosene or lubricating oils with aromatic solvents such as liquid sulfur dioxide, furfural, phenol, cresol, nitro-benzol and other well known members of the general class of aromatic solvents. Unsaturated terpenic substances are another type of materials that are useful for the present purpose. Of these the hydrocarbons such as pinene, dipentene and terpineol may be considered as examples, but rosin, rosin oil and their constituents or derivatives such as abietic acid esters and the mixed rosin acids or esters of abietic acid or partially hydrogenated resins are the most desirable types of terpenic substances.

Unsaturated fats or fatty oils, fatty acids or fatty alcohols may be employed such as lard oil, cottonseed oil, rapeseed oil, the mixed acids obtained from these natural products, or purified acids such as oleic, linoleic acid, erucic acid and the like. In some instances natural fats or fatty oils such as castor oil are not wholly desirable because the materials are not freely miscible with mineral oil, but in such instances the acids themselves may be used as well as monohydric alcoholic esters of the acids. In this class of materials may be considered ricinoleic acid, the esters of China-wood oil and the like. Alcohols obtained from unsaturated waxes or liquid waxes such as contained in sperm oil, oleyl alcohol and similar materials may be used.

The reactions involved in the present treatment are not completely understood from a chemical standpoint and may be modified somewhat by the reaction conditions and the specific materials treated. In general, however, it may be stated that the organic material either alone or admixed with solvent, such as naphtha, kerosene or the mineral oil with which it is ultimately to be blended, is treated with a halide of phosphorus. While phosphorus pentachloride may be employed, experience has shown that the trichloride is more desirable in that it produces results of better appearance and stability. Ordinarily the amount of the halide is not more than about 10% of the unsaturated material, but 5% is ordinarily satisfactory when the organic material is treated directly. When, on the other hand, a mixture of the material with mineral oil is to be treated, the amount of the halide may in some instances be almost as much as the fatty oil itself. Thus when 2 to 5% of a fatty material is added to mineral oils, the amount of the phosphorus chloride employed is preferably also 2 to 5% of the mineral oil.

The ingredients are ordinarily mixed at room temperature or at slightly elevated temperatures and are then heated to the point where reaction takes place. This is ordinarily in the range from 250 to 375° F. 300° F. is a good average temperature and under these conditions ordinarily a reaction time of one-half to one hour is provided. After the reaction period the material is cooled, for example, by adding the mineral oil with which it is to be blended or a portion thereof, and air or inert gas may be blown through the mixture for further purification. If desired, the product may be water washed or washed with mild alkali. The effect of this treatment is to remove some of the chlorine and a small amount of phosphorus and to slightly reduce load carrying capacity which, however, is sufficiently high in the washed products for most purposes. When unsaturated materials containing hydroxyl groups are employed, the amount of the phosphorus chloride or other halide may be somewhat greater than in the absence of such groups because a portion of this material reacts with the hydroxyl group to give a complex ester of the phosphorus acid. There is, however, abundant evidence to show that the substances likewise react with the phosphorus halide and both phosphorus and chlorine are permanently bound in the molecule.

It has been found that the load bearing capacity of these materials can be enhanced to a considerable degree by carrying out the reaction in the presence of small amounts of free sulfur. The amount of the sulfur may vary widely but it is ordinarily considerably less than the amount of phosphorus chloride used; for example, it may be about one-half to 2% of the organic material treated.

The products produced by the methods described above contain both phosphorus and chlorine in easily determinable amounts as well as sulfur, if this be added during reaction, and are much superior to untreated substances as load carrying agents. They are also superior to the materials made by straight sulfurization either with sulfur or sulfur chloride. Typical products made by the above process using mixtures of mineral lubricating oils and fatty oils contain from 0.05 to 0.15% phosphorus and 0.05 to 0.40% chlorine.

The products disclosed hereinabove may be used as ingredients for all types of lubricating compounds where high or extreme pressures are encountered, for example, in cutting oils or lubricating oils, for drawing, stamping, punching or other metal working operations. Such lubricants ordinarily contain 90 to 95% of mineral oil and 5 to 10% of the phosphorus chloride treated material. The phosphorus halide treated products may be used also in the lubrication of gears and other mechanical equipment where high pressures are encountered and may even be used in small amounts as blending agents in engine lubricants.

The phosphorus chloride treated unsaturated acids and esters may be converted into metal soaps for use in lubricants, for example for Deisel engines and for other purposes. The treated organic acids or esters may be converted into aluminum, nickel, calcium, tin, lead and various other polyvalent metal salts and then added to the oils in proportions of from .5 to 2.5% in which concentrations they are quite soluble in mineral oils and very effective in reducing sludging, oil deterioration, wear and the like under severe conditions. Similar metal soaps may also be prepared from the unsaturated acids or esters which are treated with phosphorus chloride in the presence of sulfur.

The nature of the present products will be illustrated by the following examples:

Example I 91.5 parts of mineral lubricating oil were placed in a kettle equipped with a stirring mechanism. It was heated to 100° F. and one part of flowers of sulfur was added and thoroughly dispersed through the oil by stirring. To this mixture, three parts of PCl$_3$ were added slowly and thereafter 2½ parts of lard oil were also gradually worked in. The mixture was then heated to 300° F. while stirring and held at that temperature for about 40 minutes. A current of air was passed through the mixture during the reaction.

The mixture was then cooled and found to be clear and light yellow in color.

A small amount of phosphorus sulfide sometimes settles out of the product especially when temperature rises much above 300° F., but this may be removed by filtration.

The product showed the following analysis:

| | Per cent |
|---|---|
| Sulphur | 1.74 |
| Phosphorus | .33 |
| Chlorine | .10 |

The product was tested on the familiar Almen testing machine and carried the full 15 weights, 15,000 pounds per square inch, with low friction. The tests were made by adding the weights gradually in the usual manner and also by adding them suddenly under shock conditions which is necessarily a more severe test. In both conditions the full 15 weights of the test were carried as stated above and the pin condition after the test was excellent.

When tested on the SAE machine, the lubricant carried 220 pounds on the scale at a speed of 1000 R. P. M. and a rubbing ratio of 14.6 to 1. During this test the loading rate was 83.5 pounds per second.

The product was much better in appearance than the familiar sulfurized oils of commerce and showed superior behavior in the above tests.

Example II

To 100 parts of winter pressed sperm oil were added 5 parts PCl$_3$ at room temperature. The mixture was heated while stirring to 300° F. and then cooled. The product recovered was homogenous, light yellow in color and miscible with mineral oils in all proportions. It was stable and contained small amounts of both phosphorus and chloride.

A 10% blend of the treated product carried the full 15 weights on the Almen machine whether the loading was gradual or under shock conditions and the pin condition was considered excellent.

Example III

Acids of castor oil, being mainly ricinoleic, were treated with 5% of phosphorus chloride at 300° F. The product was purified and then esterified with isopropyl alcohol. The ester was freely soluble in mineral oil and blends in mineral oil containing 2 to 5% of this product were tested on the Almen machine. Each sample carried the full 15 weights according to the test and gave excellent pin conditions.

If sulphur is added during the treatment, extreme pressure properties are further enhanced.

Example IV

To 100 parts of phenol extract of a Mid-Continent type mineral oil distillate were added 5 parts PCl$_3$ at room temperature. The mixture was heated while stirring to 300° F. and then cooled. The product recovered was air blown for 10 hours. A 10% blend of the treated product in mineral lubricating oil carried a full load of 15 weights on the Almen machine with the loading gradual and under shock conditions and the pin condition was considered excellent in both cases. The addition of 1.0% sulfur during the treatment further enhanced the extreme pressure lubrication properties.

Example V

Partially hydrogenated rosin, known commercially as Stabellite was heated to 250° F. where it becomes fluid, 5.0% PCl$_3$ was added and a reaction started immediately. Stirring and heating was continued until a temperature of 300° F.

was reached. Heating was then stopped and the material blended into mineral lubricating oil to a 5% concentration. No darkening of the mineral oil occurred. This blended lubricant carried the full load of 15 weights on the Almen machine with excellent pin condition.

Example VI 100 parts of oleic acid were treated with five parts of phosphorus trichloride at 300 to 325° F. for between 15 and 30 minutes. The calcium soaps were prepared from the soda soaps by double decomposition, reacting these soaps with calcium chloride in aqueous solution. The soaps were then blended with a small amount of light lubricating oil, the water distilled off and further quantities of oil added to bring the concentrations to about 1.25%. The treated oleic acid, and the calcium soaps thereof, gave the following analyses:

| PCl₃ (5%) treated oleic acid | | Calcium soap | |
|---|---|---|---|
| Phosphorus | Chlorine | Phosphorus | Chlorine |
| 0.58 | 0.72 | 0.47 | 0.30 |

The calcium soap blend was then compared with a sample of the same lubricating oil used in preparing the blend, in tests conducted in a single cylinder caterpillar Diesel engine and at the conclusion of each test the engine was taken down and the piston was carefully examined. Each part of the piston was given a demerit rating depending on its condition, wear, cleanliness, presence of gummy or carbonaceous deposits being taken into consideration. Then the rating of the engine was obtained by a system of correlation in which the relative importance of each demerit is given weight. These data are inserted in the following table in consideration of which it should be noted that the lowest demerit rating is the best:

Caterpillar single cylinder engine tests

| Oil samples | Hours | Overall piston demerit | Max. liner wear inches/1,000 hrs. |
|---|---|---|---|
| Naphthenic base oil | 100 | 2.13 | Greater than 0.001. |
| Naphthenic base oil + 1.25% of calcium soap of phosphorus trichloride treated oleic acid | 260 | 1.48 | 0.0019. |

The present invention is not to be limited to any theory of the mechanism of the reaction or to any particular method or initial organic material but only to the following claims in which it is desired to claim all novelty inherent in the invention.

We claim:

1. An improved process for producing valuable lubricant addition agents comprising heating an unsaturated terpenic compound with a phosphorus halide at a temperature from 250° to 375° F.

2. Process according to claim 1 in which a rosin compound is heated with phosphorus trichloride.

3. Process according to claim 1 in which an abietic acid compound is heated with phosphorus trichloride.

4. An improved addition agent for lubricants comprising the product obtained by reacting a terpenic substance with a phosphorus halide at a temperature from 250° to 375° F.

5. An improved addition agent for lubricants comprising the product obtained by reacting partially hydrogenated rosin with phosphorus trichloride at a temperature from 250° to 375° F.

6. Product according to claim 4 in which the terpenic substance is reacted with phosphorus trichloride.

ARNOLD J. MORWAY.
JOHN C. ZIMMER.